United States Patent
Goupil et al.

(10) Patent No.: US 11,261,758 B2
(45) Date of Patent: Mar. 1, 2022

(54) INTERMEDIATE CASE SUPPORTING REMOVABLE PANELS FITTED WITH RETAINING ELEMENTS

(71) Applicant: SAFRAN AIRCRAFT ENGINES, Paris (FR)

(72) Inventors: Frédéric Jacques Eugène Goupil, Moissy-Cramayel (FR); Rémi Abarrou, Moissy-Cramayel (FR); Azath Mohamed, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 25 days.

(21) Appl. No.: 16/835,465

(22) Filed: Mar. 31, 2020

(65) Prior Publication Data
US 2020/0318494 A1    Oct. 8, 2020

(30) Foreign Application Priority Data
Apr. 3, 2019   (FR) ...................................... 1903585

(51) Int. Cl.
*F01D 25/24*    (2006.01)
*F02C 7/32*    (2006.01)

(52) U.S. Cl.
CPC .............. *F01D 25/243* (2013.01); *F02C 7/32* (2013.01); *F05D 2240/14* (2013.01)

(58) Field of Classification Search
CPC ...... F01D 25/24; F01D 25/243; F01D 25/246; F01D 25/26; F02C 7/32; F05D 2240/14; F04D 29/40; F04D 29/4226; F04D 29/526
See application file for complete search history.

(56) References Cited

U.S. PATENT DOCUMENTS

| | | | |
|---|---|---|---|
| 2016/0039528 A1* | 2/2016 | Caruel | F01D 25/24 415/119 |
| 2017/0273390 A1* | 9/2017 | Maloney | A42B 3/145 |
| 2018/0080343 A1* | 3/2018 | Groleau | F01D 11/08 |

FOREIGN PATENT DOCUMENTS

| | | |
|---|---|---|
| FR | 3018548 A1 | 9/2015 |
| FR | 3041380 A1 | 3/2017 |

OTHER PUBLICATIONS

Preliminary Search Report issued in French Patent Application No. 1903585 dated Dec. 4, 2019.

* cited by examiner

*Primary Examiner* — David E Sosnowski
*Assistant Examiner* — Maxime M Adjagbe
(74) *Attorney, Agent, or Firm* — Pearne & Gordon LLP

(57) ABSTRACT

An intermediate turbojet case comprises a hub that supports removable panels and bleed lines, the hub comprising a flank provided with openings, each bleed line having an upstream end engaged in an opening in the flank and a downstream end terminated by a base plate through which it is fixed to an internal face of a removable panel by way of screws, each removable panel having a front edge at which it is fixed to an external lip of the hub by screws. At least one removable panel comprises a downstream edge supporting a retaining element close to the internal face to hold the base plate in contact with the internal face during a phase in which the removable panel is fixed to the hub by screwing, this phase preceding attachment of the base plate to the removable panel by screwing.

7 Claims, 5 Drawing Sheets

INTERMEDIATE CASE SUPPORTING REMOVABLE PANELS FITTED WITH RETAINING ELEMENTS

This application claims priority from French Patent Application 1903585 filed Apr. 3, 2019, the entire content of which is incorporated by reference herein.

TECHNICAL DOMAIN

The invention relates to the assembly and disassembly of bleed lines supported by panels of a turbojet intermediate case.

STATE OF PRIOR ART

A twin spool turbojet comprises an intake duct into which air enters drawn in by a fan, before being divided into a central core engine flow and a fan flow surrounding the core engine flow. After passing through the fan, the fan flow is directed in the aft direction to generate a thrust.

After passing through the fan, the core engine flow passes through a low pressure compressor and then a high pressure compressor before reaching a combustion chamber and is then expanded in a high pressure turbine and then in a low pressure turbine, before being expelled, generating an auxiliary thrust.

Each turbine and each compressor comprises blades supported by a rotor rotating about a longitudinal axis and supported by an intermediate case. This intermediate case comprises a hub fitted with external radial arms through which it is connected to an external case that surrounds it, and internal radial arms through which it supports an internal bearing.

The primary flow circulates in an annular space called the core flow stream, delimited internally by the rotor and externally by an inter-flow stream fairing of which the intermediate case forms part. The fan flow circulates in a different space called the fan flow stream, delimited internally by the inter-flow stream fairing and externally by the external case.

The intermediate case is fitted with bleed lines associated with bleed valves referred to as VBV (Variable Bleed Valves), that are open in some situations to evacuate air from the core engine flow to the fan flow, to avoid setting up a surging phenomenon due to overpressurisation of compressors that can damage them.

Due to maintenance constraints, the bleed lines must be easy to remove and reassemble, to facilitate access to components located in the region of the intermediate fairing, in other words located radially between the core engine flow stream and the fan flow stream.

The purpose of the invention is to provide a solution that simplifies removal and reassembly of these bleed lines.

PRESENTATION OF THE INVENTION

To achieve this, the purpose of the invention is an intermediate turbojet case, comprising a hub that supports a shell formed from removable panels and bleed lines at an orientation that is oblique from a longitudinal axis, the hub comprising a flank provided with openings in the downstream part, each bleed line having an upstream end engaged in an opening in the flank and a downstream end terminated by a base plate through which the bleed line is fixed to an internal face of a removable panel by means of screws passing through this panel and screwed into the base, each removable panel having a front edge at which it is fixed to an external lip of the hub by means of screws that pass through this removable panel to be screwed into the hub, characterised in that at least one removable panel is equipped with an element retaining the base plate along the internal face during a phase in which the removable panel is fixed to the hub by screwing, this phase preceding attachment of the base plate to the internal face of the removable panel by screwing.

The invention thus makes it possible to preinstall bleed lines to facilitate final attachment by screws.

The invention also relates to an intermediate case thus defined, wherein at least one removable panel comprises a downstream edge, and in which the retaining element is supported by this downstream edge and extends along the internal face.

The invention also relates to an intermediate case thus defined, wherein the downstream edge extends perpendicular to the remaining part of the removable panel, and wherein the retaining element extends at a distance from the internal face of the removable panel.

The invention also relates to an intermediate case thus defined, wherein the retaining element is supported by the downstream edge and by the internal face, and wherein this retaining element is provided with a groove running along the internal face.

The invention also relates to an intermediate case thus defined, wherein the retaining element fitted on the removable panel is made of a elastomer material.

The invention also relates to an intermediate case thus defined, wherein the base plate is fitted with a spur engaging with the retaining element.

The invention also relates to a turbojet equipped with an intermediate case thus defined.

DESCRIPTION OF EMBODIMENTS

Figure 1:
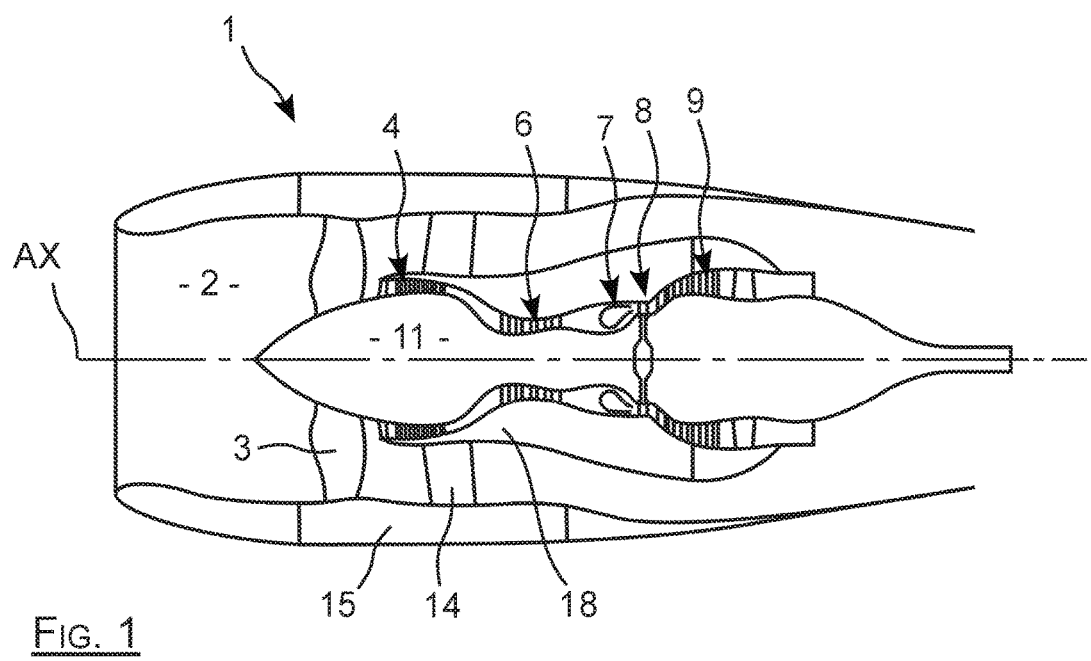
FIG. 1 is a longitudinal section through a twin-spool turbojet.
Figure 2:
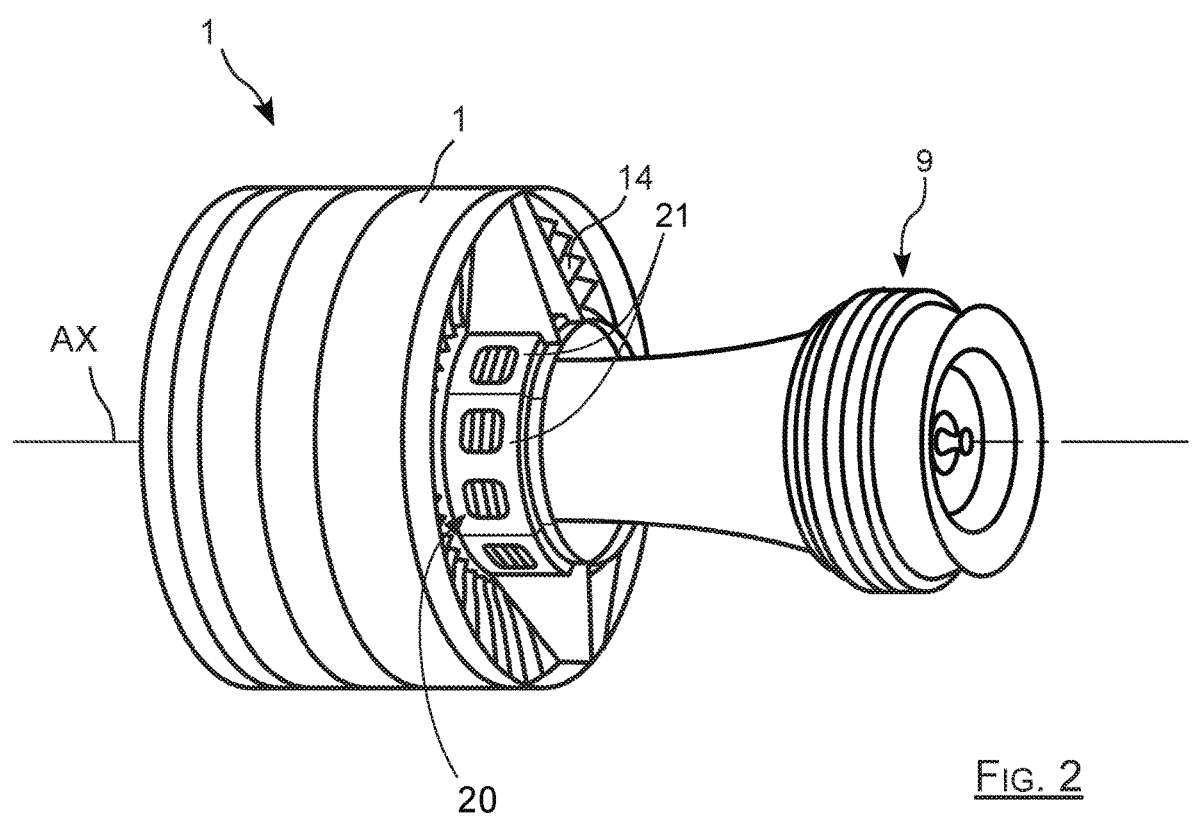
FIG. 2 is a perspective overview of a twin spool turbojet.

On FIGS. 1 and 2, a twin spool turbojet 1 comprises an intake duct 2 into which air enters drawn in by a fan 3, then divided into a central core engine flow and a fan flow surrounding the core engine flow.

After passing through the fan 3, the core engine flow passes through a low pressure compressor 4 and then a high pressure compressor 6, to reach a combustion chamber 7 before being expanded in a high pressure turbine 8 and then in a low pressure turbine 9.

Each turbine and each compressor comprises blades supported by a rotor 11 rotating about a longitudinal axis AX and supported by an intermediate case 12. This intermediate case comprises a hub 13 fitted with external radial arms 14 through which it is connected to an external case 16 that surrounds it, and internal radial arms 17 through which it supports an internal bearing.

The primary flow circulates in an annular space called the core flow stream, delimited internally by the rotor 11 and externally by an inter-flow stream fairing 18 of which the intermediate case 12 forms part. The fan flow circulates in a different space called the fan flow stream, delimited internally by the inter-flow stream fairing 18 and externally by the external case 16.

Figure 3:
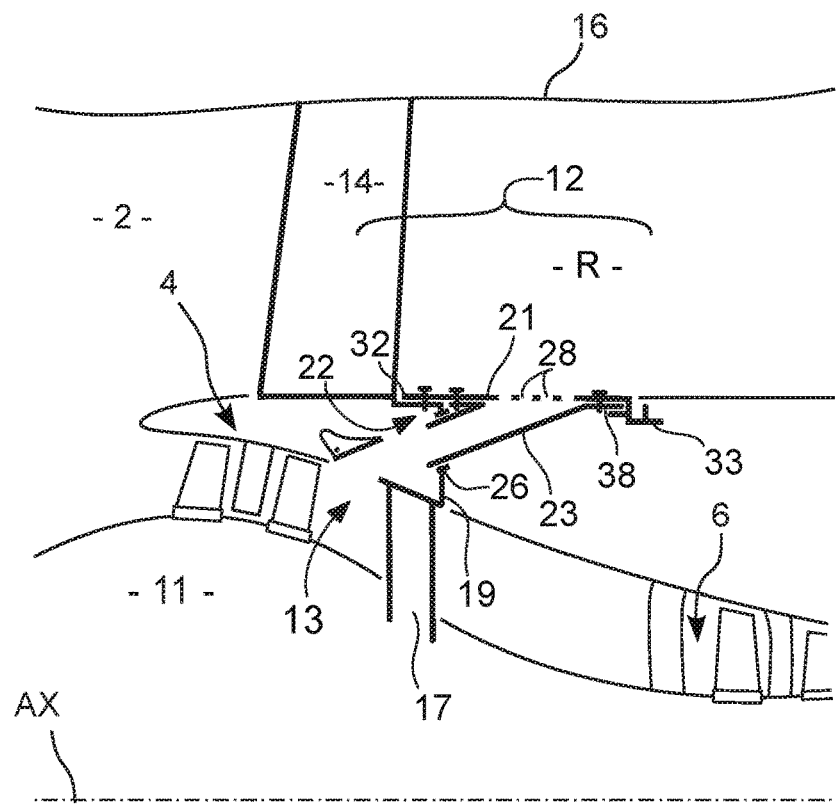
FIG. 3 is a diagrammatic sectional half-view of a turbojet according to the invention in the region of its intermediate case.

As can be seen on FIG. 3, the hub 13 comprises a ring-shaped flank 19 extending radially from the core engine flow stream to the fan flow stream, and that is held in place by radial arms 14. This hub 13 is equipped on its downstream side by a shell 20 formed from removable panels 21 fixed to a lip 22 of the external periphery of its flank 19 and extending parallel to the AX axis in the downstream direction.

This intermediate case 12 supports several bleed lines 23 uniformly distributed about the AX axis and each having an orientation oblique to this axis. Each line 23 comprises an upstream end 24 engaged in a corresponding opening 26 in the flank 19 and a downstream end 27 fixed to an internal face of a removable panel 21, to open up through an opening 28 in this removable panel 21. The opening 26 formed in the flank 19 forms a seat for the upstream end of the line 23.

Figure 5:
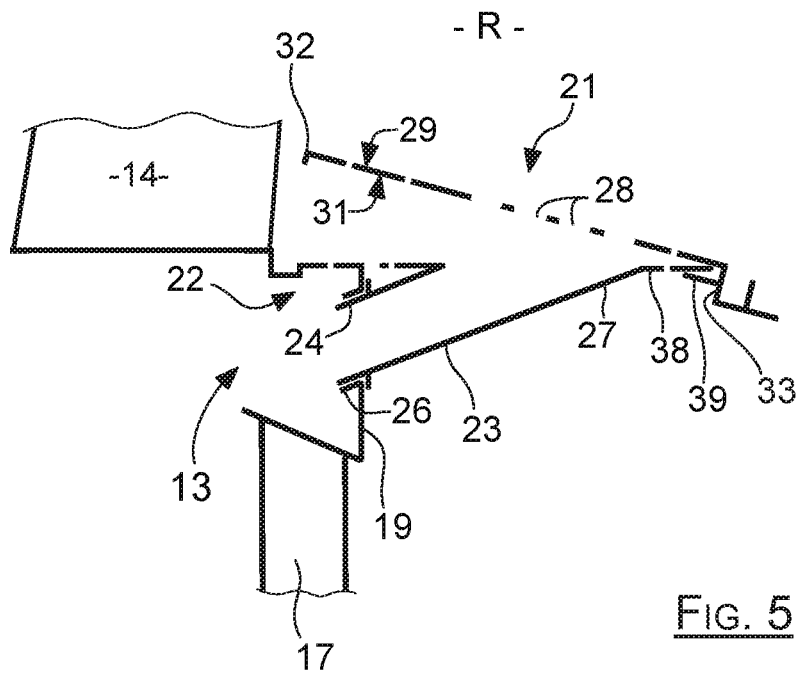
FIG. 5 is a diagrammatic sectional half-view of a turbojet according to the invention showing details of its intermediate case during a first step in the assembly of an intermediate panel.

The general shape of each removable panel 21 is generally a portion of a cylinder. It comprises an external face 29 and an internal face 31 oriented towards the AX axis, these faces being marked on FIG. 5, and is delimited by a generally rectangular contour comprising an upstream edge 32 projecting towards the AX axis and a downstream edge 33 also projecting towards the AX axis from the internal face. All the removable panels 21 fixed to the hub 13 jointly delimit a shell of the hub that can be seen on FIG. 2.

Figure 4:
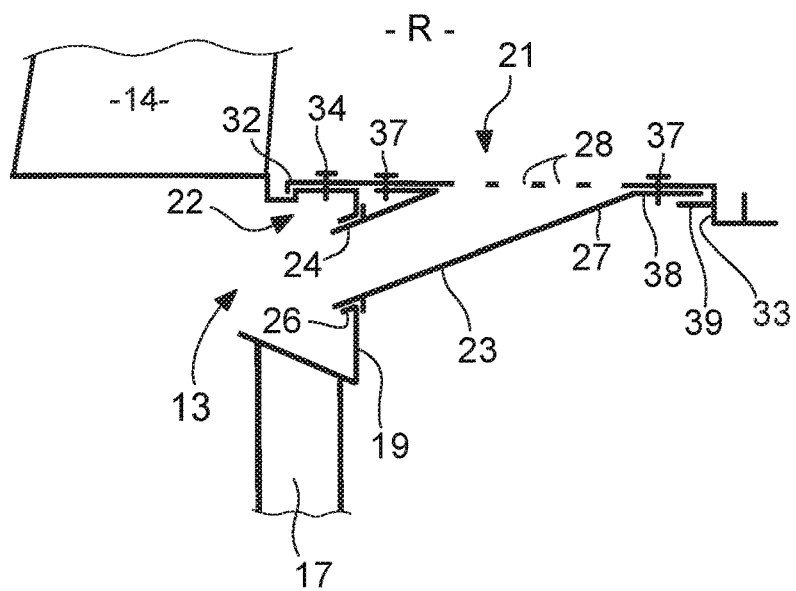
FIG. 4 is a diagrammatic sectional half-view of a turbojet according to the invention showing details of its installed intermediate case supporting an intermediate panel.

As can be seen in more detail on FIG. 4, the removable panel 21 is rigidly fixed to the hub 13 that supports it by attachment screws 34 that pass through it close to its upstream edge 32 and are screwed into the lip 22 of the hub 13. These screws 34 have their heads located on the external face of the panel 21 and extend radially relative to the AX axis. The upstream edge 32 engages in contact with one face of the lip 22, which assures precise positioning of the panel along the AX direction.

The upstream end 24 of the line 23 is engaged in the opening 26 but it is held in place by attachment of its downstream end 27 to the internal face of the panel 21 by means of screws 37 passing through this panel 21. These screws 37 are screwed into a base plate 38 terminating the downstream end 27 of the duct, these screws 37 having their heads located at the external face of the panel 21 and extending radially from the AX axis.

Taking account of the upstream border 32 that positions the panel 21 relative to the lip 22, it is impossible to fix firstly the downstream end 27 of the line to the panel 21 so that the assembly formed by the panel 21 supporting this line 23 can then be installed on the hub 13. In general, the panel and line installation operation is complicated by the fact that the access available to the operator is limited to the region adjacent to the external face of the removable panels.

It is possible to install the line 23 due to a retaining element 39 located at the downstream end of the panel 21, so that the downstream end 27 of the line 23 can be positioned relative to the panel 21, when the panel 21 is fixed to the hub 13, and before making the actual attachment of the downstream end 27 to this panel 21 using the attachment screw.

The retaining element 39 projects upstream from the downstream edge 33, which extends perpendicular to the internal face 31. This element 39 extends along the internal face 31 at a small distance from it so that a downstream edge of the base plate 38 can be engaged between the internal face 31 and the retaining element 39. The base plate 38 is thus prepositioned relative to the panel 21, and the line assembly is held pulled in the upstream direction when the panel is put into position.

The assembly is made by an operator who can access only the region R facing the external face 29 of the panel 21 downstream from the internal radial arms.

The assembly consists firstly of engaging the upstream end 24 of the line 23 in the opening 26 of the flank 19 of the hub 13, and then engaging the downstream edge of the base plate 38 between the element 39 and the internal face 31 of the panel 21. At this stage that corresponds to the situation in FIG. 5, the panel 21 has an oblique orientation: its downstream end occupies a position that corresponds approximately to its final position, while its upstream end is radially at a distance from the lip 22 of the hub 13.

Figure 6:
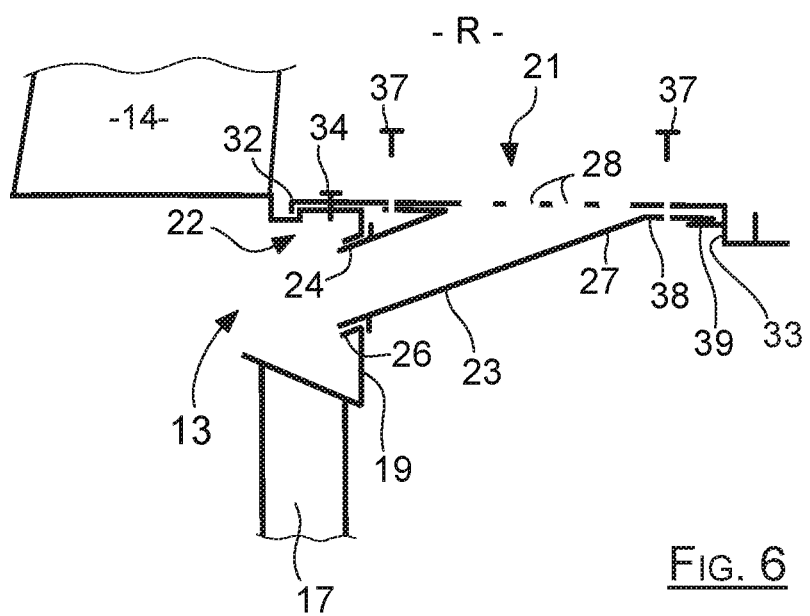
FIG. 6 is a diagrammatic sectional half-view of a turbojet according to the invention showing details of its intermediate case during a second step in the assembly of an intermediate panel.

The operator can then turn the upstream end of the panel 21 towards the X axis, to apply it in contact with the lip 22, so as to engage and tighten the screws 34 so as to completely fix the panel 21 on the hub 13. At this stage that corresponds to the situation in FIG. 6, the panel is rigidly fixed to the hub 13, the upstream edge 24 of the line 23 is engaged in the opening 26, and its downstream end 27 is retained by the retaining element 39 without yet being fixed to the panel 21.

The operator then simply needs to engage the screws 37 through the panel 21 to screw them into the corresponding threaded holes in the base plate 38, to as to completely fix the line 23 to the panel 21, which corresponds to the situation in FIG. 4, in which the assembly is fully assembled.

Disassembly of the panel 21 and the line 23 consists of performing similar actions but in the reverse order.

Figure 7:
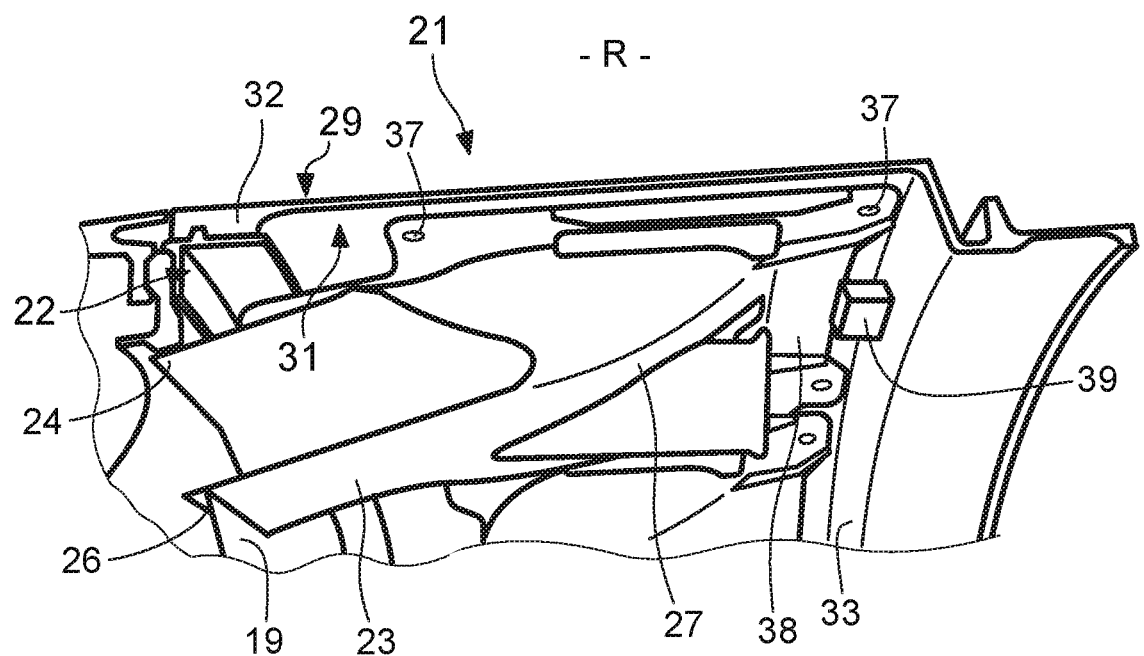
FIG. 7 is a partial perspective view of a removable panel to which a bleed line according to a first embodiment of the invention is fixed.
Figure 8:
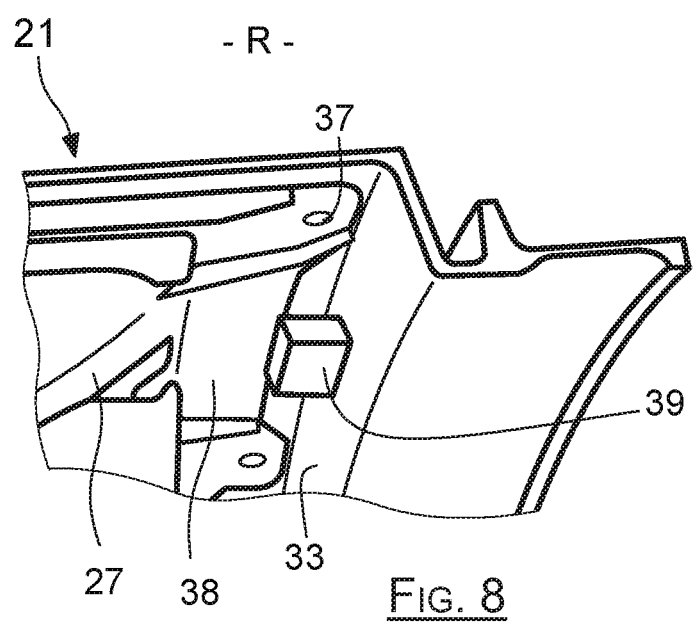
FIG. 8 is a perspective view showing the retaining element according to the first embodiment of the invention.
Figure 9:
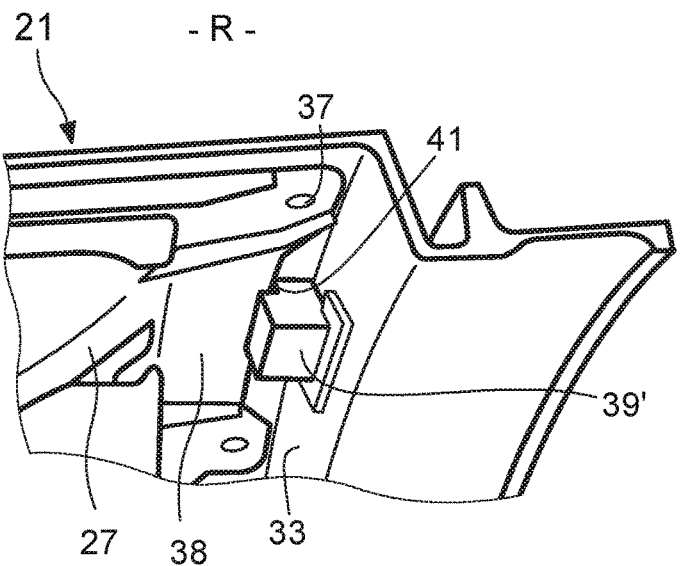
FIG. 9 is a perspective view showing the retaining element according to a second embodiment of the invention.

As can be seen more clearly on FIGS. 7 and 8, the retaining element 39 may be in the form of a parallelepiped-shaped element supported by the edge 33 extending parallel to the internal face 31 while remaining at a distance from the internal face, this distance being greater than the thickness of the base plate 38 in its downstream region. In this way, the line 23 is retained by engagement of the downstream edge of the base plate 38 between this retaining element 39 and the internal face 31.

The globally parallelepiped-shaped retaining element 39 can be an element made of an elastomer material fixed to the upstream face of the edge 33, to avoid damaging, in other words locally deteriorating the surface, of the base plate 38 during assembly operations.

Figure 10:
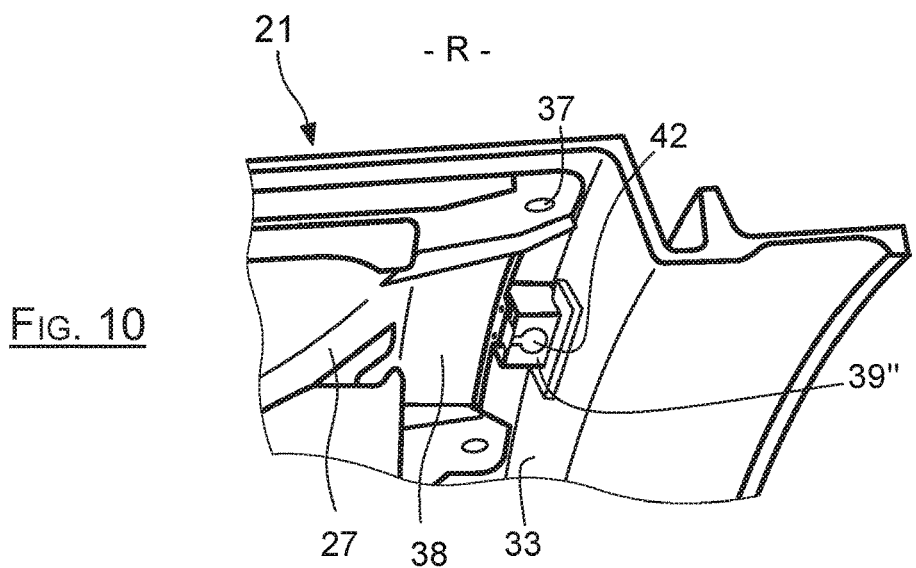
FIG. 10 is a perspective view showing the retaining element according to a third embodiment of the invention.

In the second embodiment shown on FIG. 10, the retaining element reference 39' is a globally parallelepiped-shaped element that is jointly fixed to the upstream face of the edge 33 and to the internal face 31 of the panel, and that comprises a groove 41 extending along the internal face 31 to receive and to block the edge of the base plate 38.

Figure 11:
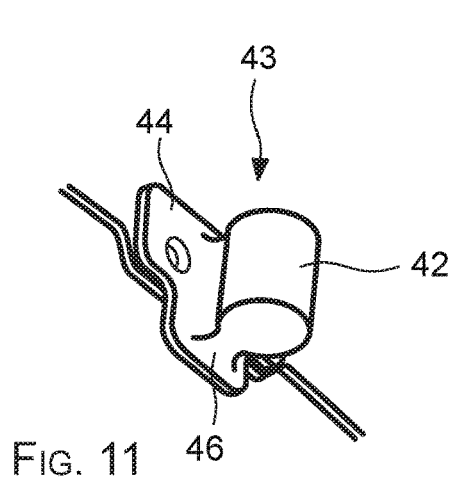
FIG. 11 is a detailed view showing a coupling stud according to the third embodiment.

In the case of this third embodiment, the retaining element reference 39", cooperates with a spur 42 supported by a base plate 38 to form a connection with this spur. More particularly, and as can be seen on FIG. 11, the spur 42 is a generally cylindrical element oriented towards the AX axis and that forms part of an insert 43 comprising a plate 44 fixed to the downstream edge of the base plate 38 by two screws, the cylindrical spur 42 being connected to this plate 44 through a rib 46.

Figure 12:
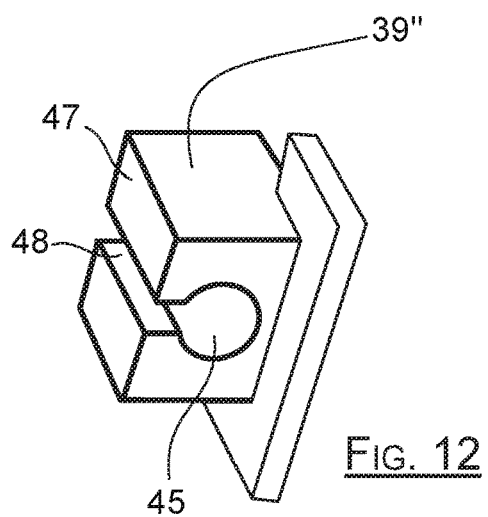
FIG. 12 is a detailed view of the retaining element shown alone according to the third embodiment of the invention.

Additionally, and as can be seen on FIG. 12, the retaining element 39" comprises a cylindrical hole oriented in the radial direction and that communicates with the upstream face 47 of this retaining element through a slit 48.

In this third embodiment, fixation of the line 23 to the panel 21 consists of engaging the cylindrical spur 42 in the hole 45 by insertion. Once the assembly is in place, as can be seen on FIG. 10, the rib 46 extends in the slit 48.

In this third embodiment, the retaining element 39" can also be made of an elastomer material so that the cylindrical spur 42 can then be engaged in the element 39" by insertion following a displacement oriented parallel to the AX axis.

The invention claimed is:

1. An intermediate turbofan case (12), comprising:
a hub (13) that extends around a longitudinal axis (AX) of the engine, the hub (13) comprising a flank (19) provided with openings (26); and
a shell (20) supported by the hub (13) and formed from removable panels (21) and bleed lines (23) at an orientation that is oblique from a longitudinal axis (AX), each bleed line (23) having an upstream end (24) engaged in an opening (26) in the flank (19) and a downstream end (27) terminated by a base plate (38) through which the bleed line (23) is fixed to an internal face (31) of a removable panel (21) by screws (37) passing through the removable panel (21) and screwed into the base plate (38), each removable panel (21) having a front edge (32) which is fixed to an external lip (22) of the hub (13) by screws that pass through the removable panel (21) to be screwed into the hub (13),
wherein at least one removable panel (21) is fixed to the hub (13) by screwing and equipped with a retaining element (39, 39', 39") retaining the base plate (38) along the internal face (31), wherein the base plate (38) is additionally attached to the internal face (31) of the at least one removable panel (21) by screwing.

2. The intermediate turbofan case (12) according to claim 1, wherein the at least one removable panel (21) comprises a downstream edge (33), and the retaining element (39, 39', 39") is supported by the downstream edge (33) and extends along the internal face (31).

3. The intermediate turbofan case (12) according to claim 2, wherein the downstream edge (33) of the at least one removable panel (21) extends perpendicular to a remaining part of the at least one removable panel (21), and wherein the retaining element (39) extends at a distance from the internal face (31) of the at least one removable panel (21).

4. The intermediate turbofan case (12) according to claim 2, wherein the retaining element (39') is supported by the downstream edge (33) and by the internal face (31), and wherein the retaining element (39') is provided with a groove (41) running along the internal face (31).

5. The intermediate turbofan case (12) according to claim 1, wherein the retaining element (39, 39', 39") is made of an elastomer material.

6. The intermediate turbofan case (12) according to claim 1, wherein the base plate (38) is fitted with a spur (42) engaging with the retaining element (39").

7. A turbofan equipped with the intermediate turbofan case (12) according to claim 1.

* * * * *